United States Patent
He et al.

(10) Patent No.: US 12,145,453 B2
(45) Date of Patent: Nov. 19, 2024

(54) SAFETY MONITORING METHOD AND SYSTEM FOR VEHICLE, AND DEVICE

(71) Applicant: NIO TECHNOLOGY (ANHUI) CO., LTD, Hefei (CN)

(72) Inventors: Teng He, Shanghai (CN); Rui Hua, Shanghai (CN); Shizhe Zeng, Shanghai (CN); Haoming Yan, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 365 days.

(21) Appl. No.: 17/495,959

(22) Filed: Oct. 7, 2021

(65) Prior Publication Data
US 2022/0111732 A1      Apr. 14, 2022

(30) Foreign Application Priority Data
Oct. 10, 2020   (CN) .......................... 202011078075.3

(51) Int. Cl.
*B60L 3/00*        (2019.01)
*B60L 58/12*       (2019.01)
(Continued)

(52) U.S. Cl.
CPC .............. *B60L 3/0046* (2013.01); *B60L 58/12* (2019.02); *B60L 58/24* (2019.02); *G08B 25/10* (2013.01);
(Continued)

(58) Field of Classification Search
CPC ........ B60L 3/0046; B60L 58/12; B60L 58/24; B60L 2240/545; B60L 2240/547;
(Continued)

(56) References Cited

U.S. PATENT DOCUMENTS

2013/0234672 A1*  9/2013  Kubota ................. H02J 7/0016
                                                              320/134
2019/0006724 A1   1/2019  Cho et al.

FOREIGN PATENT DOCUMENTS

CN      103522909      1/2014
CN      106314167      1/2017
(Continued)

OTHER PUBLICATIONS

Chen et al., CN 111469709 (A), EPO machine translation (Year: 2020).*

(Continued)

*Primary Examiner* — Yuen Wong
(74) *Attorney, Agent, or Firm* — Sheridan Ross P.C.

(57) ABSTRACT

The invention relates to the technical field of battery safety, and in particular to a safety monitoring method and system for a vehicle. The safety monitoring method includes: when a vehicle is in a parked state, waking up a battery management controller at specific time intervals, and obtaining status data of the battery by means of a battery management controller; determining, based on the status data, whether the battery is in an anomalous state; and when the battery is not in the anomalous state, controlling the battery management controller to enter hibernation state again; or when the battery is in the anomalous state, further waking up a wireless communications network, and uploading the status data and/or an alarm signal to a remote monitoring platform by means of the wireless communications network.

10 Claims, 4 Drawing Sheets

(51) Int. Cl.
  *B60L 58/24* (2019.01)
  *G08B 25/10* (2006.01)
  *H04W 52/02* (2009.01)

(52) U.S. Cl.
  CPC ... *H04W 52/0203* (2013.01); *B60L 2240/545* (2013.01)

(58) Field of Classification Search
  CPC .... B60L 58/10; G08B 25/10; H04W 52/0203; H04W 84/18; H01M 2010/4278; H01M 10/425; H01M 2220/20; H01M 10/48; Y02E 60/10; Y02T 10/70; Y02T 90/16
  See application file for complete search history.

(56) References Cited

FOREIGN PATENT DOCUMENTS

| | | | |
|---|---|---|---|
| CN | 107933335 | | 4/2018 |
| CN | 110015128 A | * | 7/2019 |
| CN | 110481383 | | 11/2019 |
| CN | 111469709 A | * | 7/2020 |
| CN | 111731149 | | 10/2020 |
| JP | 2014-088150 | | 5/2014 |

OTHER PUBLICATIONS

Zhang, et al., CN 110015128 (A), EPO machine translation (Year: 2019).*
Official Action with English Translation for China Patent Application No. 202011078075.3, dated Jul. 1, 2024, 16 pages.
Extended Search Report for European Patent Application No. 21201746.1, dated Feb. 25, 2022, 12 pages.

* cited by examiner

SAFETY MONITORING METHOD AND SYSTEM FOR VEHICLE, AND DEVICE

CROSS-REFERENCE TO RELATED APPLICATION

This application claims the benefit of China Patent Application No. 202011078075.3 filed Oct. 10, 2020, the entire contents of which are incorporated herein by reference in its entirety.

TECHNICAL FIELD

The invention relates to the field of vehicle monitoring technologies, and in particular to a safety monitoring method and system for a vehicle.

BACKGROUND ART

With the rapid development of technologies such as vehicle electrification, the Internet of vehicles, and mobile communications, real-time safety monitoring of traction batteries for new energy vehicles has become particularly important. In order to meet requirements of safe operation and regulatory supervision, vehicle-related data needs to be remotely monitored, and the data needs to be uploaded to a state-level or enterprise-level remote monitoring platform. The related data that needs to be monitored includes vehicle data, motor data, vehicle position data, status data of a traction battery, alarm data, etc.

Among the above monitored data, the status data of the traction battery and anomaly alarm data are core content of the monitoring. Usually, when a vehicle is in a running state, for example, is in motion or temporarily parked or being charged, electronic controllers of the vehicle run at full power. A controller of a battery management system monitors operating data of the vehicle in real time, and then uploads the data in combination with a vehicle control unit and a wireless communications network, etc. When the vehicle is in a non-running state, for example, is parked for a long time, a traction battery of the vehicle is disconnected, and all the electronic controllers of the vehicle are from hibernation state. In this case, a status of the vehicle, especially a status of the traction battery, cannot be monitored. However, a specific number of traction battery anomalies occur when a vehicle is in a parked state, which undoubtedly increases safety hazards and reduces safety of the vehicle. For this reason, it is required to monitor a status of the traction battery in the parked state. However, all the electronic controllers of the vehicle, whether it is the controller of the battery management system, or the vehicle control unit and the wireless communications network, cause a large amount of energy consumption during operation. Therefore, it is difficult for the electronic controllers to keep a continuous working state when the vehicle is shut down and parked for a long time.

For this reason, it is required to propose a new safety monitoring method and system for a vehicle, and a device to solve the above technical problems.

SUMMARY OF THE INVENTION

In order to solve at least one of the above problems in the prior art, that is, to solve the problem that a battery cannot be continuously and safely monitored when a new energy vehicle is parked, the invention provides a safety monitoring method for a vehicle. The safety monitoring method includes:

when a vehicle is in a parked state, waking up a battery management controller from hibernation state at specific time intervals, and obtaining status data of a battery by means of the battery management controller;

determining, based on the status data, whether the battery is in an anomalous state; and when the battery is not in the anomalous state, controlling the battery management controller to enter hibernation state again; or when the battery is in the anomalous state, further waking up a wireless communications network in hibernation state, and uploading the status data and/or an alarm signal to a remote monitoring platform by means of the wireless communications network.

In a preferred technical solution of the above safety monitoring method for a vehicle, the safety monitoring method further includes:

when the battery is not in the anomalous state, recording a cumulative number of monitoring times;

determining whether the cumulative number of monitoring times reaches a preset number of times; and when the cumulative number of monitoring times reaches the preset number of times, waking up the wireless communications network in hibernation state, and uploading the previously accumulated status data to the remote monitoring platform by means of the wireless communications network; and after the uploading ends, controlling the wireless communications module to enter hibernation state again.

In a preferred technical solution of the above safety monitoring method for a vehicle, the safety monitoring method further includes:

when the cumulative number of monitoring times reaches the preset number of times, performing vehicle monitoring on the vehicle, and obtaining monitored vehicle data; and uploading the monitored vehicle data and the accumulated status data to the remote monitoring platform by means of the wireless communications network.

In a preferred technical solution of the above safety monitoring method for a vehicle, the safety monitoring method further includes:

after the uploading ends, clearing the cumulative number of monitoring times.

In a preferred technical solution of the above safety monitoring method for a vehicle, the safety monitoring method further includes:

when the battery is in the anomalous state, continuously obtaining the status data of the battery, and uploading the obtained status data and/or the alarm signal to the remote monitoring platform by means of the wireless communications network until the anomalous state is removed.

In a preferred technical solution of the above safety monitoring method for a vehicle, the step of "waking up a wireless communications network from hibernation state" further includes:

waking up a wireless communications module directly or indirectly connected to the battery management controller; and/or waking up a vehicle control unit and an onboard gateway connected to the vehicle control unit; and/or waking up the vehicle control unit, the onboard gateway connected to the vehicle control unit, and a telematics box connected to the onboard gateway.

In a preferred technical solution of the above safety monitoring method for a vehicle, the safety monitoring method further includes:

when the battery is not in the anomalous state, determining a current risk probability of the battery; and determining, based on the current risk probability, a time interval for the next wake-up.

In a preferred technical solution of the above safety monitoring method for a vehicle, the current risk probability is determined based on one or more of the status data of the battery, diagnostic data of the battery, thermal management mode of the battery, and environmental data.

In a preferred technical solution of the above safety monitoring method for a vehicle, the current risk probability includes a high-risk probability and a low-risk probability, and the step of "determining, based on the current risk probability, a time interval for the next wake-up" further includes:

if the current risk probability is a high-risk probability, determining the time interval for the next wake-up as a first preset time interval; or if the current risk probability is a low-risk probability, determining the time interval for the next wake-up as a second preset time interval, where the first preset time interval is less than the second preset time interval.

In a preferred technical solution of the above safety monitoring method for a vehicle, the status data includes at least one of a state of charge, a cell temperature, a cell voltage, a difference between temperatures of cells, and an insulation resistance value.

In a preferred technical solution of the above safety monitoring method for a vehicle, the step of "determining, based on the status data, whether the battery is in an anomalous state" further includes:

when at least one of the following determination conditions is satisfied, determining that the battery is in the anomalous state, where the determination conditions include:

the cell temperature is greater than or equal to a maximum temperature threshold or has an outlier value;

the cell voltage is greater than or equal to a maximum voltage threshold or has an outlier value;

the difference between the temperatures of the cells is greater than or equal to a maximum temperature difference threshold; and the insulation resistance value is less than a minimum resistance threshold; and otherwise, determining that the battery is not in the anomalous state.

The proposal further provides a safety monitoring system for a vehicle. The safety monitoring system includes:

a wake-up control module configured to: when a vehicle is in a parked state, wake up a battery management controller from hibernation state at specific time intervals; when the battery is not in the anomalous state, control the battery management controller to enter hibernation state again; and when the battery is in the anomalous state, further wake up a wireless communications network in hibernation state;

a data obtaining module configured to obtain status data of the battery by means of the battery management controller;

a battery status determination module configured to determine, based on the status data, whether the battery is in the anomalous state; and a sending control module configured to upload the status data and/or an alarm signal to a remote monitoring platform by means of the wireless communications network.

In a preferred technical solution of the above safety monitoring system for a vehicle, the safety monitoring system further includes:

a number-of-times recording module configured to: when the battery is not in the anomalous state, record a cumulative number of monitoring times; and a number-of-times determination module configured to determine whether the cumulative number of monitoring times reaches a preset number of times, where the wake-up control module is further configured to: when the cumulative number of monitoring times reaches the preset number of times, wake up the wireless communications network from hibernation state;

the sending control module is further configured to upload the previously accumulated status data to the remote monitoring platform by means of the wireless communications network; and the wake-up control module is further configured to: after the uploading ends, control the wireless communications module to enter hibernation state again.

In a preferred technical solution of the above safety monitoring system for a vehicle, the data obtaining module is further configured to: when the cumulative number of monitoring times reaches the preset number of times, obtain monitored vehicle data after vehicle monitoring is performed on the vehicle; and the sending control module is further configured to upload the monitored vehicle data and the accumulated status data to the remote monitoring platform by means of the wireless communications network.

In a preferred technical solution of the above safety monitoring system for a vehicle, the safety monitoring system further includes:

a number-of-times clearing module configured to: after the uploading ends, clear the cumulative number of monitoring times.

In a preferred technical solution of the above safety monitoring system for a vehicle, the data obtaining module is further configured to: when the battery is in the anomalous state, continuously obtain the status data of the battery; and the sending control module is further configured to upload the continuously obtained status data and/or the alarm signal to the remote monitoring platform by means of the wireless communications network until the anomalous state is removed.

In a preferred technical solution of the above safety monitoring system for a vehicle, the wake-up control module wakes up the wireless communications network from hibernation state in the following manner:

waking up a wireless communications module directly or indirectly connected to the battery management controller; and/or waking up a vehicle control unit and an onboard gateway connected to the vehicle control unit; and/or waking up the vehicle control unit, the onboard gateway connected to the vehicle control unit, and a telematics box connected to the onboard gateway.

In a preferred technical solution of the above safety monitoring system for a vehicle, the safety monitoring system further includes:

a risk determination module configured to: when the battery is not in the anomalous state, determine a current risk probability of the battery; and a time interval determination module configured to determine, based on the current risk probability, a time interval for the next wake-up.

In a preferred technical solution of the above safety monitoring system for a vehicle, the risk determination module determines the current risk probability of the battery based on one or more of the status data of the battery, diagnostic data of the battery, thermal management mode of the battery, and environmental data.

In a preferred technical solution of the above safety monitoring system for a vehicle, the current risk probability includes a high-risk probability and a low-risk probability, and the time interval determination module determines, based on the current risk probability in the following manner, the time interval for the next wake-up:

if the current risk probability is a high-risk probability, determining the time interval for the next wake-up as a first preset time interval; or if the current risk probability is a low-risk probability, determining the time interval for the next wake-up as a second preset time interval, where the first preset time interval is less than the second preset time interval.

In a preferred technical solution of the above safety monitoring system for a vehicle, the status data includes at least one of a state of charge, a cell temperature, a cell voltage, a difference between temperatures of cells, and an insulation resistance value.

In a preferred technical solution of the above safety monitoring system for a vehicle, the battery status determination module determines, based on the status data in the following manner, whether the battery is in the anomalous state:

when at least one of the following determination conditions is satisfied, determining that the battery is in the anomalous state, where the determination conditions include:

the cell temperature is greater than or equal to a maximum temperature threshold or has an outlier value;

the cell voltage is greater than or equal to a maximum voltage threshold or has an outlier value;

the difference between the temperatures of the cells is greater than or equal to a maximum temperature difference threshold; and the insulation resistance value is less than or equal to a minimum resistance threshold; and otherwise, determining that the battery is not in the anomalous state.

The present application further provides a storage device in which a plurality of program codes are stored, where the program codes are adapted to be loaded and run by a processor to perform the safety monitoring method for a vehicle according to any one of the above preferred technical solutions.

The present application further provides a control device, including a processor and a storage device, where the storage device is adapted to store a plurality of program codes, and the program codes are adapted to be loaded and run by the processor to perform the safety monitoring method for a vehicle according to any one of the above preferred technical solutions.

It can be understood by those skilled in the art that, in the preferred technical solutions of the invention, when the vehicle is in the parked state, the battery management controller in hibernation state is woken up at specific time intervals, and the status data of the battery is obtained; it is determined, based on the status data, whether a status of the battery is anomalous; and the battery management controller is controlled to be in hibernation again when the battery is not in the anomalous state, and the wireless communications network is further woken up when the battery is in the anomalous state and anomalous status data and/or an alarm signal are/is uploaded to the remote monitoring platform. This can not only implement all-weather monitoring of a status of a traction battery in the parked state, but also remotely upload data purposefully to reduce energy consumption, which improves the quality of monitoring and also greatly reduces the energy consumption of monitoring.

Specifically, the battery management controller is woken up only when the status data of the battery needs to be obtained, the battery management controller is controlled to be in hibernation again when the battery is not in the anomalous state, so that the battery management controller is in hibernation state most of the time, and is woken up for a short time only during obtaining of the status data. In this way, the energy consumption of a monitoring process can be greatly reduced, and the status data can also be effectively obtained. By waking up the wireless communications network to upload data and/or an alarm only when the battery is in the anomalous state, so that the wireless communications network is in hibernation state most of the time, this greatly reduces the energy consumption of the monitoring process and can upload data in time.

Further, when the battery is not in the anomalous state, the cumulative number of monitoring times is recorded; and when the cumulative number of monitoring times reaches the preset number of times, the wireless communications network is woken up, and the accumulated status data is uploaded to the remote monitoring platform. According to the safety monitoring method, data can be uploaded purposefully, an energy consumption increase caused by data uploading in each monitoring process can be avoided, and load on the vehicle to store the status data can be reduced.

Further, when the cumulative number of monitoring times reaches the preset number of times, vehicle monitoring is performed on the vehicle and the monitored vehicle data is obtained; and the monitored vehicle data and the accumulated status data are uploaded to the remote monitoring platform by means of the wireless communications network. According to the safety monitoring method in the present application, on the basis of battery monitoring, battery safety requirements and vehicle monitoring requirements are cleverly combined, and on the basis of battery monitoring, the vehicle is properly woken up, and a status of the vehicle is monitored and the monitored vehicle data is uploaded, to further improve the quality of monitoring while minimizing the energy consumption of monitoring.

Further, when the battery is in the anomalous state, the status data is continuously obtained and the data and/or the alarm signal are/is uploaded to the remote monitoring platform. According to the safety monitoring method in the present application, data can be continuously recorded when the battery is anomalous, thereby providing an effective basis for a fault analysis, and maintenance and upgrade of a battery system, etc.

Further, when the battery is not in the anomalous state, the current risk probability of the battery is determined and the time interval for the next wake-up is determined based on the current risk probability, so that in the present application, when safety monitoring is performed on the battery, the time interval can be changed based on the risk probability of the battery. When a safety risk of the battery is relatively low, the battery should be monitored as little as possible, and when the safety risk of the battery is relatively high, the battery should be monitored as much as possible, thereby improving the quality of obtaining data while effectively controlling energy consumption.

Solution 1. A safety monitoring method for a vehicle, where the safety monitoring method includes:
when a vehicle is in a parked state, waking up a battery management controller from hibernation state at specific time intervals, and obtaining status data of a battery by means of the battery management controller;
determining, based on the status data, whether the battery is in an anomalous state; and
when the battery is not in the anomalous state, controlling the battery management controller to enter hibernation state again; or
when the battery is in the anomalous state, further waking up a wireless communications network in hibernation state, and uploading the status data and/or an alarm signal to a remote monitoring platform by means of the wireless communications network.

Solution 2. The safety monitoring method for a vehicle according to solution 1, where the safety monitoring method further includes:
when the battery is not in the anomalous state, recording a cumulative number of monitoring times;
determining whether the cumulative number of monitoring times reaches a preset number of times; and
when the cumulative number of monitoring times reaches the preset number of times, waking up the wireless communications network from hibernation state, and uploading the previously accumulated status data to the remote monitoring platform by means of the wireless communications network; and
after the uploading ends, controlling the wireless communications module to enter hibernation state again.

Solution 3. The safety monitoring method for a vehicle according to solution 2, where the safety monitoring method further includes:
when the cumulative number of monitoring times reaches the preset number of times, performing vehicle monitoring on the vehicle, and obtaining monitored vehicle data; and
uploading the monitored vehicle data and the accumulated status data to the remote monitoring platform by means of the wireless communications network.

Solution 4. The safety monitoring method for a vehicle according to solution 2, where the safety monitoring method further includes:
after the uploading ends, clearing the cumulative number of monitoring times.

Solution 5. The safety monitoring method for a vehicle according to solution 1, where the safety monitoring method further includes:
when the battery is in the anomalous state, continuously obtaining the status data of the battery, and uploading the obtained status data and/or the alarm signal to the remote monitoring platform by means of the wireless communications network until the anomalous state is removed.

Solution 6. The safety monitoring method for a vehicle according to solution 1, where the step of "waking up a wireless communications network from hibernation state" further includes:
waking up a wireless communications module directly or indirectly connected to the battery management controller; and/or
waking up a vehicle control unit and an onboard gateway connected to the vehicle control unit; and/or
waking up the vehicle control unit, the onboard gateway connected to the vehicle control unit, and a telematics box connected to the onboard gateway.

Solution 7. The safety monitoring method for a vehicle according to solution 1, where the safety monitoring method further includes:
when the battery is not in the anomalous state, determining a current risk probability of the battery; and determining, based on the current risk probability, a time interval for the next wake-up.

Solution 8. The safety monitoring method for a vehicle according to solution 7, where the current risk probability is determined based on one or more of the status data of the battery, diagnostic data of the battery, thermal management mode of the battery, and environmental data.

Solution 9. The safety monitoring method for a vehicle according to solution 7, where the current risk probability includes a high-risk probability and a low-risk probability, and the step of "determining, based on the current risk probability, a time interval for the next wake-up" further includes:
if the current risk probability is a high-risk probability, determining the time interval for the next wake-up as a first preset time interval; or
if the current risk probability is a low-risk probability, determining the time interval for the next wake-up as a second preset time interval,
where the first preset time interval is less than the second preset time interval.

Solution 10. The safety monitoring method for a vehicle according to solution 1, where the status data includes at least one of a state of charge, a cell temperature, a cell voltage, a difference between temperatures of cells, and an insulation resistance value.

Solution 11. The safety monitoring method for a vehicle according to solution 10, where the step of "determining, based on the status data, whether the battery is in an anomalous state" further includes:
when at least one of the following determination conditions is satisfied, determining that the battery is in the anomalous state,
where the determination conditions include:
the cell temperature is greater than or equal to a maximum temperature threshold or has an outlier value;
the cell voltage is greater than or equal to a maximum voltage threshold or has an outlier value;
the difference between the temperatures of the cells is greater than or equal to a maximum temperature difference threshold; and
the insulation resistance value is less than a minimum resistance threshold; and
otherwise, determining that the battery is not in the anomalous state.

Solution 12. A safety monitoring system for a vehicle, where the safety monitoring system includes:
a wake-up control module configured to: when a vehicle is in a parked state, wake up a battery management controller from hibernation state at specific time intervals; when the battery is not in the anomalous state, control the battery management controller to enter hibernation state again; and when the battery is in the anomalous state, further wake up a wireless communications network in hibernation state;

a data obtaining module configured to obtain status data of the battery by means of the battery management controller;

a battery status determination module configured to determine, based on the status data, whether the battery is in the anomalous state; and a sending control module configured to upload the status data and/or an alarm signal to a remote monitoring platform by means of the wireless communications network.

Solution 13. The safety monitoring system for a vehicle according to solution 12, where the safety monitoring system further includes:

a number-of-times recording module configured to: when the battery is not in the anomalous state, record a cumulative number of monitoring times; and a number-of-times determination module configured to determine whether the cumulative number of monitoring times reaches a preset number of times, where the wake-up control module is further configured to: when the cumulative number of monitoring times reaches the preset number of times, wake up the wireless communications network from hibernation state;

the sending control module is further configured to upload the previously accumulated status data to the remote monitoring platform by means of the wireless communications network; and the wake-up control module is further configured to: after the uploading ends, control the wireless communications module to enter hibernation state again.

Solution 14. The safety monitoring system for a vehicle according to solution 13, where the data obtaining module is further configured to: when the cumulative number of monitoring times reaches the preset number of times, obtain monitored vehicle data after vehicle monitoring is performed on the vehicle; and the sending control module is further configured to upload the monitored vehicle data and the accumulated status data to the remote monitoring platform by means of the wireless communications network.

Solution 15. The safety monitoring system for a vehicle according to solution 13, where the safety monitoring system further includes:

a number-of-times clearing module configured to: after the uploading ends, clear the cumulative number of monitoring times.

Solution 16. The safety monitoring system for a vehicle according to solution 12, where the data obtaining module is further configured to: when the battery is in the anomalous state, continuously obtain the status data of the battery; and the sending control module is further configured to upload the continuously obtained status data and/or the alarm signal to the remote monitoring platform by means of the wireless communications network until the anomalous state is removed.

Solution 17. The safety monitoring system for a vehicle according to solution 12, where the wake-up control module wakes up the wireless communications network from hibernation state in the following manner:

waking up a wireless communications module directly or indirectly connected to the battery management controller; and/or waking up a vehicle control unit and an onboard gateway connected to the vehicle control unit; and/or waking up the vehicle control unit, the onboard gateway connected to the vehicle control unit, and a telematics box connected to the onboard gateway.

Solution 18. The safety monitoring system for a vehicle according to solution 12, where the safety monitoring system further includes:

a risk determination module configured to: when the battery is not in the anomalous state, determine a current risk probability of the battery; and a time interval determination module configured to determine, based on the current risk probability, a time interval for the next wake-up.

Solution 19. The safety monitoring system for a vehicle according to solution 18, where the risk determination module determines the current risk probability of the battery based on one or more of the status data of the battery, diagnostic data of the battery, thermal management mode of the battery, and environmental data.

Solution 20. The safety monitoring system for a vehicle according to solution 18, where the current risk probability includes a high-risk probability and a low-risk probability, and the time interval determination module determines, based on the current risk probability in the following manner, the time interval for the next wake-up:

if the current risk probability is a high-risk probability, determining the time interval for the next wake-up as a first preset time interval; or if the current risk probability is a low-risk probability, determining the time interval for the next wake-up as a second preset time interval, where the first preset time interval is less than the second preset time interval.

Solution 21. The safety monitoring system for a vehicle according to solution 12, where the status data includes at least one of a state of charge, a cell temperature, a cell voltage, a difference between temperatures of cells, and an insulation resistance value.

Solution 22. The safety monitoring system for a vehicle according to solution 21, where the battery status determination module determines, based on the status data in the following manner, whether the battery is in the anomalous state:

when at least one of the following determination conditions is satisfied, determining that the battery is in the anomalous state, where the determination conditions include:

the cell temperature is greater than or equal to a maximum temperature threshold or has an outlier value;

the cell voltage is greater than or equal to a maximum voltage threshold or has an outlier value;

the difference between the temperatures of the cells is greater than or equal to a maximum temperature difference threshold; and the insulation resistance value is less than or equal to a minimum resistance threshold; and otherwise, determining that the battery is not in the anomalous state.

Solution 23. A storage device, in which a plurality of program codes are stored, where the program codes are adapted to be loaded and run by a processor to perform the safety monitoring method for a vehicle according to any one of the solutions 1 to 11.

Solution 24. A control device, including a processor and a storage device, the storage device being adapted to store a plurality of program codes, where the program codes are adapted to be loaded and run by the processor to perform the safety monitoring method for a vehicle according to any one of the solutions 1 to 11.

BRIEF DESCRIPTION OF THE DRAWINGS

The safety monitoring method and system for a vehicle, and a device in the invention will be described below with reference to the drawings and in conjunction with a battery electric vehicle. In the drawings.

DETAILED DESCRIPTION OF EMBODIMENTS

Figure 1:
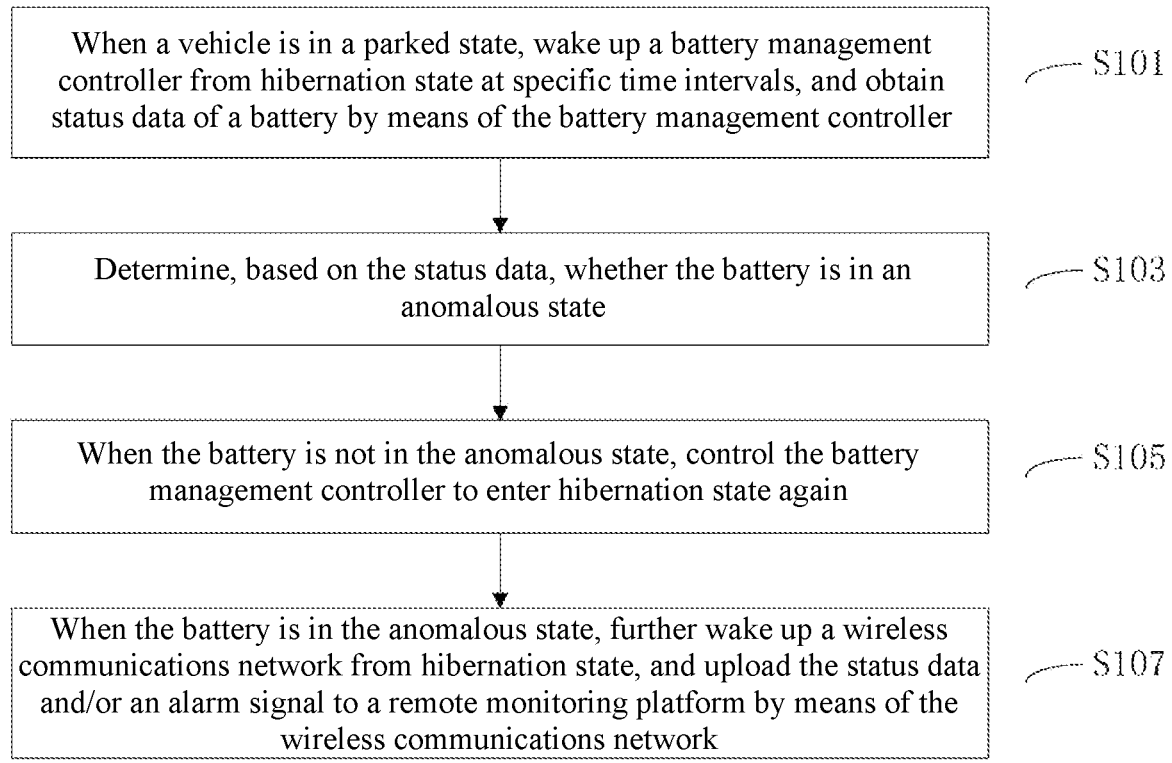
FIG. 1 is a main flowchart of a safety monitoring method for an electric vehicle according to the invention.

Preferred embodiments of the invention are described below with reference to the drawings. It should be understood by those skilled in the art that these embodiments are only for explaining the technical principles of the invention and are not intended to limit the scope of protection of the invention. For example, although the embodiments are described in conjunction with a battery electric vehicle, it is not intended to limit the scope of protection of the invention. Without departing from the principles of the invention, those skilled in the art can apply the invention to other application scenarios, especially an application scenario of a new energy vehicle. For example, the present application may also be applied to a vehicle with a battery, such as a hybrid vehicle and an extended-range electric vehicle.

In the description of the present invention, a "module" and a "processor" may include hardware, software, or a combination thereof. A module may include a hardware circuit, various suitable sensors, a communication port, and a memory, or may include a software part, such as program code, or may be a combination of software and hardware. The processor may be a central processing unit, a microprocessor, a graphics processing unit, a digital signal processor, or any other suitable processor. The processor has a data and/or signal processing function. The processor may be implemented in software, hardware, or a combination thereof. A non-transitory computer-readable storage medium includes any suitable medium that can store program code, such as a magnetic disk, a hard disk, an optical disc, a flash memory, a read-only memory, or a random access memory. The term "A and/or B" indicates all possible combinations of A and B, for example, only A, only B, or A and B. The term "at least one of A or B" or "at least one of A and B" has a meaning similar to "A and/or B" and may include only A, only B, or A and B. The terms "first", "second" and "third" are for descriptive purposes only and should not be construed as indicating or implying relative importance.

In addition, it should also be noted that, in the description of the invention, the terms "engage" and "connect" should be interpreted in a broad sense unless explicitly defined and limited otherwise, which, for example, may mean a fixed connection, a detachable connection or an integral connection; may mean a mechanical connection or an electrical connection; and may mean a direct connection, an indirect connection by means of an intermediary, or internal communication between two elements. For those skilled in the art, the specific meaning of the above-mentioned terms in the invention can be interpreted according to the specific situation.

As described in the Background Art, generally, when a battery electric vehicle is in motion or temporarily parked or being charged or in other states, electronic controllers of the vehicle are running at full power, can monitor the vehicle in real time, and can upload monitored data to a remote monitoring platform by means of a wireless communications network. However, when the battery electric vehicle is in a parked state, a relay of a traction battery is usually disconnected, and the electronic controllers of the vehicle are from hibernation state. In this case, the vehicle, especially the traction battery, cannot be monitored in real time. In the parked state, the traction battery still has a risk of being subjected to anomalies, and therefore, it is also necessary to monitor the traction battery in the parked state. However, considering energy consumption and other factors, whether it is a controller of a battery management system, or a vehicle control unit and an onboard gateway, it is difficult to for the electronic controllers to keep a continuous working state when the battery electric vehicle is parked for a long time.

In view of this, the present application provides a safety monitoring method for a battery electric vehicle. In the safety monitoring method, when a battery electric vehicle is in a parked state, a battery management controller is woken up at specific time intervals, and status data of the traction battery is obtained by means of the battery management controller; and it is determined, based on the status data, whether a status of the traction battery is anomalous; and the battery management controller is controlled to be in hibernation again when the traction battery is not in an anomalous state; or when the traction battery is in the anomalous state, a wireless communications network is further woken up and anomalous status data and/or an alarm signal are/is uploaded by means of the wireless communications network. Therefore, a status of a traction battery in the parked state can be continuously monitored, and in addition, data can be remotely uploaded purposefully, which improves the quality of monitoring and also greatly reduces the energy consumption of monitoring.

The safety monitoring method for a battery electric vehicle in the present application will be described below with reference to FIG. 1. FIG. 1 is a main flowchart of a safety monitoring method for an electric vehicle according to the invention.

As shown in FIG. 1, the safety monitoring method (briefly referred to as the safety monitoring method or the method) for a battery electric vehicle (briefly referred to as an electric vehicle or a vehicle) of the present application includes the following steps:

S101: When an electric vehicle is in a parked state, wake up a battery management controller from hibernation state at specific time intervals, and obtain status data of a traction battery by means of the battery management controller. For example, when the electric vehicle is in the parked state, the battery management controller in hibernation state is woken up every 20 min, and data of the traction battery, such as a cell temperature, a state of charge, a difference between temperatures of cells, and an insulation resistance value, is obtained by means of the battery management controller.

The parked state in the present application is a state when the traction battery of the vehicle is disconnected (for example, a relay connected to the traction battery is disconnected), and electronic controllers of the vehicle are in hibernation. The battery management controller in the present application may be a controller running a battery management system (BMS software), where the battery management system is responsible for monitoring status data of each cell, for example, detecting a temperature, current, voltage, etc. of each cell by means of a corresponding sensor, and based on the above parameters, estimating a state of charge (SOC) of the traction battery and calculating a difference between temperatures of cells, and an insulation resistance value. The above-mentioned detection method and estimation method are common knowledge in the art, and details are not described herein.

Certainly, in a conventional electrical and electronic architecture, a controller of the battery management system is an electronic controller (ECU) in the traction battery that is specially responsible for battery management. However, in a gradually developed centralized domain controller, the battery management system may alternatively be integrated in a domain controller (for example, integrated into a traction domain controller or chassis domain controller, etc.), or all electronic controllers of the vehicle may even be placed in a general central control unit, and an onboard CAN network or an onboard Ethernet may be used to implement communication between the battery management system and other controllers. The present application does not limit a specific arrangement manner of the battery management system.

A method for waking up the battery management controller in hibernation state may be, for example: using a real time clock (RTC) chip for the battery management controller, for example, arranging a clock chip in the traction domain controller of the battery management controller, and setting that a wake-up request is sent to the battery management controller every 20 min to start the battery management controller of the traction battery.

S103: Determine, based on the status data, whether the traction battery is in an anomalous state. For example, after the status data of the traction battery is obtained, it is determined, based on a comparison result of each piece of status data and a preset safety threshold interval or a statistical conclusion, whether the traction battery is in the anomalous state.

The anomalous state in the present application means that an actual value of one or more of the pieces of status data of the traction battery are not within the preset safety threshold interval, or have an obvious data outlier phenomenon based on a statistical conclusion. For example, a normal operating temperature interval of the traction battery may be $-20°$ C. to $50°$ C., and when an actual temperature of one or several cells in the traction battery is less than $-20°$ C. or greater than $50°$ C., it is considered that the traction battery is in the anomalous state. For another example, according to detected cell temperatures, most cells are at $30°$ C., while a particular cell is at $45°$ C. In this case, the cell has an obvious data outlier phenomenon, and it is considered that the traction battery is in the anomalous state. Similarly, the safety threshold interval of the status data such as the state of charge of the traction battery, the cell voltage, the difference between the temperatures of the cells, or the insulation resistance value may also be tested and preset, and then it is determined, based on the safety threshold interval of the state of charge, the difference between the temperatures of the cells, or the insulation resistance value, whether the traction battery is in the anomalous state. Certainly, the above specific values are for exemplary purposes only, and those skilled in the art may set the specific safety threshold interval of each piece of status data based on actual situations, and the present application does not impose too many limitations thereon.

S105: When the traction battery is not in the anomalous state, control the battery management controller to enter hibernation state again. For example, when the actual value of each piece of status data of the traction battery is within the preset safety threshold interval, it is considered that the traction battery is currently not in the anomalous state. In other words, a current safety risk of the traction battery is relatively low, and therefore, the battery management controller may be controlled to enter hibernation state again, and waits for the next wake-up and detection.

S107: When the traction battery is in the anomalous state, further wake up a wireless communications network from hibernation state, and upload the status data and/or an alarm signal to a remote monitoring platform by means of the wireless communications network. For example, when an actual value of any status data of the traction battery is not within the preset safety threshold interval, it is considered that the traction battery is currently in the anomalous state. In other words, the current safety risk of the traction battery is relatively high, and therefore, it is necessary to upload monitored data to the remote communications platform and issue an alarm in time. In this case, the wireless communications network may be further woken up, for example, a wireless communications module (including but not limited to: a 4G/5G communications module, a Wi-Fi communications module, a Bluetooth communications module, or an NFC communications module) directly connected to the battery management controller is woken up and the monitored status data and/or the alarm signal are/is uploaded to the remote communications platform by means of the wireless communications module, or a wireless communications module of a domain controller of the battery management controller is woken up and the monitored status data and/or the alarm signal are/is uploaded to the remote communications platform by means of the wireless communications module. Alternatively, if the battery management controller is not integrated into the domain controller, or the domain controller of the battery management controller is not provided with a wireless communications module, a vehicle control unit (VCU) of the electric vehicle and an onboard gateway integrated with a wireless communications module may be further woken up, and the status data of the traction battery and/or the alarm signal may be uploaded to the remote monitoring platform by means of the vehicle control unit and the onboard gateway. Still alternatively, if the onboard gateway configured for the vehicle control unit does not have a wireless communication function, after the vehicle control unit and the onboard gateway are woken up, a telematics box (referred to as onboard T-BOX) may be further woken up, and the status data of the traction battery and/or the alarm signal may be uploaded to the remote monitoring platform by means of the vehicle control unit, the onboard gateway, and the onboard T-BOX. Certainly, if possible, all the foregoing wireless communications module, onboard gateway (integrated with a wireless communications module), and onboard T-BOX may be woken up at the same time, and the status data and/or the alarm signal may be uploaded to the remote monitoring platform by means of the wireless communications module, the onboard gateway, and the onboard T-BOX together.

Those skilled in the art can understand that, the manner described above or any other feasible manners can be used, provided that when the traction battery is in the anomalous state, the status data of the traction battery obtained by the battery management controller and/or the alarm signal can be effectively uploaded to the remote monitoring platform.

It can be seen from the above description that when the electric vehicle is in the parked state, the battery management controller in hibernation state is woken up at specific time intervals to obtain the status data of the traction battery, and it is determined, based on the status data, whether the status of the traction battery is anomalous; and the battery management controller is controlled to be in hibernation again when the traction battery is not in the anomalous state; or when the traction battery is in the anomalous state, the wireless communications network is further woken up and anomalous status data and/or an alarm signal are/is uploaded to the remote monitoring platform. According to the safety monitoring method in the present application, the status of the traction battery in the parked state can be continuously monitored, and in addition, data can be remotely uploaded purposefully, which improves the quality of monitoring and also reduces the energy consumption of monitoring.

Figure 2:
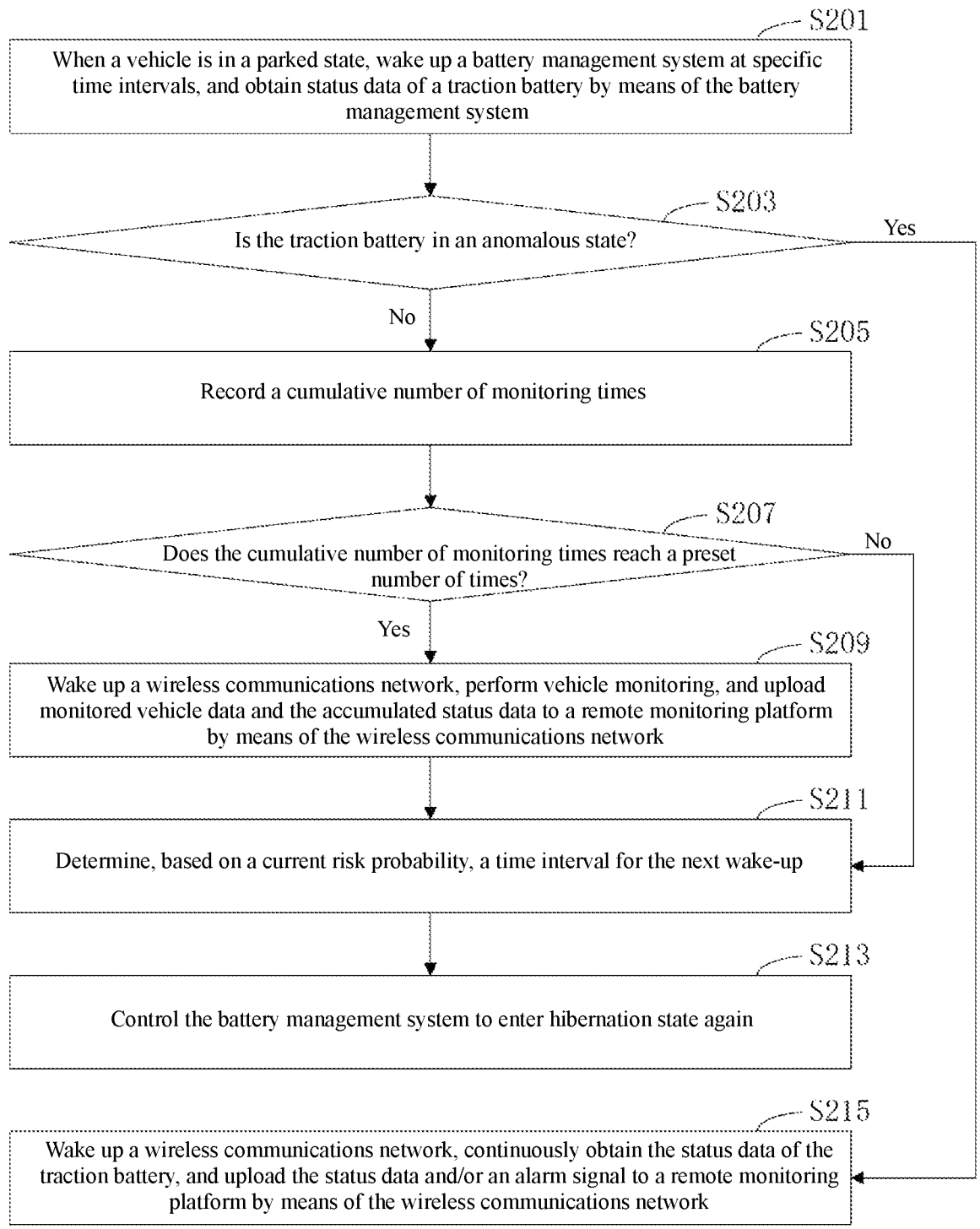
FIG. 2 is a flowchart of a possible embodiment of a safety monitoring method for an electric vehicle according to the invention.

The safety monitoring method in the present application will be described in detail below with reference to FIG. 2. FIG. 2 is a flowchart of a possible embodiment of a safety monitoring method for an electric vehicle according to the invention.

Referring to FIG. 2, in a possible embodiment, the safety monitoring method for an electric vehicle includes the following steps:

S201: When an electric vehicle is in a parked state, wake up a battery management controller at specific time intervals, and obtain status data of a traction battery by means of the battery management controller. In this embodiment, the battery management controller is a controller running a battery management system (BMS). The status data of the traction battery includes a cell temperature, a state of charge, a difference between temperatures of cells, and an insulation resistance value. For a wake-up process of the battery management system and a process of obtaining the status data of the traction battery, refer to the description in the foregoing control method. During a period when the battery management system monitors the traction battery, only internal sampling and communication lines, such as a daisy chain or a CAN network, of the battery management system work in the vehicle, and the remaining electronic controllers are still from hibernation state. Certainly, if the battery management system is integrated into a domain controller, a related communications line in the domain controller is also required to work in a detection process. In this embodiment, the time interval may be adjusted based on a current status of the traction battery, and details will be described in the following embodiment.

S203: Determine, based on the status data, whether the traction battery is in an anomalous state. If the traction battery is not in the anomalous state, step S205 is performed; and if the traction battery is in the anomalous state, step S215 is performed.

In this embodiment, whether the traction battery is in the anomalous state can be determined by determining whether at least one of the following conditions is satisfied.

Condition 1: The cell temperature is greater than or equal to a maximum temperature threshold or has an outlier value. The maximum temperature threshold may be a fixed value, such as 50° C., and certainly, may alternatively be determined based on a current environmental parameter, for example, based on a reference table of a current environmental temperature and the maximum temperature threshold, or based on a corresponding formula between the current environmental temperature and the maximum temperature threshold. The outlier value of the cell temperature may be obtained based on a statistical conclusion. Certainly, a specific value of the maximum temperature threshold is not limited to the above specific example, and those skilled in the art can make adjustments based on specific situations, and such adjustments do not depart from the principle of the present application. When a temperature of a cell or temperatures of several cells in the traction battery are greater than or equal to the maximum temperature threshold or have outlier values, it proves that temperatures of some cells in the traction battery at this time are too high or anomalous, which poses a relatively high safety risk. Otherwise, a safety risk is relatively low.

Condition 2: The cell voltage is greater than or equal to a maximum voltage threshold or has an outlier value. Similar to the above, the maximum voltage threshold may be a fixed value, or may be determined based on a reference table or corresponding formula. The outlier value of the cell voltage may be obtained based on a statistical conclusion. When a voltage of a cell in the traction battery is greater than or equal to the maximum voltage threshold or has an outlier value, it proves that voltages of some cells in the traction battery are too high or anomalous, and a safety risk is relatively high. Otherwise, a safety risk is relatively low.

Condition 3: The difference between the temperatures of the cells is greater than or equal to a maximum temperature difference threshold. Similar to the above, the maximum temperature difference threshold may be a fixed value, such as 6° C., or may be determined based on a reference table or corresponding formula. Certainly, a specific value of the maximum temperature difference threshold is not limited to the above specific example, and those skilled in the art can make adjustments based on specific situations, and such adjustments do not depart from the principle of the present application. When a difference between temperatures of two cells in the traction battery is greater than or equal to the maximum temperature difference threshold, it proves that a temperature in the traction battery fluctuates greatly, and a safety risk is relatively high. Otherwise, a safety risk is relatively low.

Condition 4: The insulation resistance value is less than a minimum resistance threshold. The minimum resistance threshold may be determined based on tests, or based on technical specifications or empirical values in the art. For example, the insulation resistance value may be 0.5 MΩ. When an insulation resistance value of the traction battery is less than 0.5 MΩ, it proves that the insulation of the traction battery becomes worse, and a safety risk is relatively high. Otherwise, a safety risk is relatively low. Certainly, a specific value of the minimum resistance threshold is not limited to the above specific example, and those skilled in the art can make adjustments based on specific situations, and such adjustments do not depart from the principle of the present application.

Condition 5: An alarm occurs for cell monitoring and warning. The alarm for the cell monitoring and warning includes a battery internal short circuit alarm, a battery self-discharge alarm, a battery lithium-precipitation alarm, etc. A detection method and an alarm method for the above warnings are relatively common in the art, and details are not described herein. When an alarm occurs for cell monitoring and warning, it proves that a cell is anomalous, and a safety risk is relatively high. Otherwise, a safety risk is relatively low.

When none of the above conditions are satisfied, it is considered that the current safety risk of the traction battery is relatively low, that is, the traction battery is not in the anomalous state, and step S205 is performed; or when at least one of the above conditions is satisfied, it is considered that the current safety risk of the traction battery is relatively high, that is, the traction battery is in the anomalous state, and step S215 is performed.

S205: A cumulative number of monitoring times is recorded. In the present application, a non-transitory computer-readable storage medium or the like may be used to record a cumulative number of times the battery management system is woken up to monitor the traction battery.

S207: Determine whether the cumulative number of monitoring times reaches a preset number of times. If the cumulative number of monitoring times reaches the preset number of times, step S209 is performed; and if the cumulative number of monitoring times does reach the preset number of times, step S211 is performed. In this step, the preset number of times may be 5, 6, 7, etc. The preset number of times may be obtained based on tests. The preset number of times is set to balance the time-effectiveness of uploading the status data of the traction battery against energy consumption of a monitoring process. When the cumulative number of monitoring times reaches the preset number of times, it proves that the status data obtained by the battery management system has accumulated to a specific amount, and data needs to be uploaded together at a time. In this case, step S209 is performed. Conversely, when the cumulative number of monitoring times does not reach the preset number of times, it proves that an amount of accumulated status data obtained by the battery management system is relatively small, and the status data can still be obtained. In this case, step S211 is performed.

S209: When the cumulative number of monitoring times reaches the preset number of times, wake up a wireless communications network in hibernation state, perform vehicle monitoring on the electric vehicle to obtain monitored vehicle data, upload detected vehicle data and the previously accumulated status data of the traction battery to a remote monitoring platform by means of the wireless communications network, and clear the cumulative number of monitoring times. In this step, if the cumulative number of monitoring times reaches the preset number of times, it may be considered that the status data obtained by the battery management system has been accumulated to a specific amount, or it is required to monitor the traction battery and the vehicle control unit in detail and upload data, and to ensure time-effectiveness of data monitoring, the data needs to be periodically uploaded together at a time. In this case, all related controllers of the vehicle are further woken up, all the controllers of the vehicle are monitored to obtain monitored vehicle data, and the wireless communications network is then woken up. For example, the vehicle control unit and the onboard gateway are woken up, and the monitored vehicle data and the accumulated status data of the traction battery are uploaded together to the remote monitoring platform by means of the vehicle control unit and the onboard gateway; or the above data is uploaded to the remote monitoring platform by means of the onboard gateway and the onboard T-BOX as described above. After the uploading ends, all the controllers are controlled to enter hibernation state, the cumulative number of monitoring times is cleared, and counting is restarted. In the present application, the monitored vehicle data includes, but is not limited to, vehicle data, motor data, vehicle position data, alarm data, etc. An obtaining method and an uploading method of the foregoing data are commonly used in the art, and therefore details are not described.

When the traction battery is not in the anomalous state, the cumulative number of monitoring times is recorded; and when the cumulative number of monitoring times reaches the preset number of times, the wireless communications network is woken up and starts to upload the status data to the remote monitoring platform. According to the safety monitoring method, data can be uploaded purposefully, an energy consumption increase caused by data uploading in each monitoring process can be avoided, and load on the vehicle to store the status data can be reduced, thereby ensuring the time-effectiveness of uploading the data. Further, when the cumulative number of monitoring times reaches the preset number of times, vehicle monitoring is performed on the electric vehicle and the monitored vehicle data is obtained; and the monitored vehicle data and the accumulated status data of the traction battery are uploaded together to the remote monitoring platform by means of the wireless communications network. According to the safety monitoring method in the present application, on the basis of battery monitoring, battery safety requirements and vehicle monitoring requirements are cleverly combined, and on the basis of battery monitoring, the vehicle is woken up at the proper times, and a status of the vehicle is monitored and the monitored vehicle data is uploaded, to further improve the quality of monitoring while minimizing the energy consumption of monitoring.

S211: Determine, based on a current risk probability, a time interval for the next wake-up. Specifically, when the traction battery is not in the anomalous state, the current risk probability of the traction battery is first determined; then it is determined, based on the current risk probability, the time interval for the next wake-up. In the present application, the current risk probability is intended to represent a probability that the traction battery has a safety risk or is in the anomalous state at the current time and later time. When the current risk probability is relatively high, there is a relatively large possibility that an anomaly occurs in the traction battery within a period of time in the future, and therefore, the time interval for the next wake-up may be appropriately shortened. Conversely, if the current risk probability is relatively low, there is a relatively small possibility that an anomaly occurs in the traction battery within a period of time in the future, and therefore, a current time interval may remain unchanged or the time interval for the next wake-up may be appropriately prolonged.

For example, the current risk probability may be determined based on one or more of the status data of the traction battery, diagnostic data of the traction battery, thermal management mode of the traction battery, and environmental data. The status data of the traction battery may include the state of charge of the traction battery, the cell temperature, the number of charging and discharging cycles, etc. The diagnostic data of the traction battery may include whether a current and a voltage of the traction battery, a difference between temperatures of cells, and an insulation resistance value are normal, whether components are faulty (such as a sensor fault or an actuator fault), etc. Both of the above data are available based on the battery management system, and their obtaining methods are relatively conventional. Details are not described herein. The thermal management mode of the traction battery usually includes a standard mode, an energy-saving mode, etc. The thermal management mode is used to control timing of performing thermal management on the traction battery, for example, timing of cooling or heating the traction battery. Thermal management forms include, but are not limited to, air cooling, water cooling, etc. The thermal management mode may be directly read from a related controller or memory, which is not limited in this embodiment. The environmental data includes an environmental temperature, environmental humidity, etc., and such data may be obtained based on corresponding sensors. The above data may be obtained when the battery management system is woken up and obtains the status data of the traction battery, and certainly, may alternatively be obtained when this step is performed.

The applicant found through research that, based on physical characteristics of the traction battery, there is a relatively high probability that the traction battery has a safety risk when the state of charge is too high or too low, the cell temperature is relatively high, and a relatively large number of cycles are used; otherwise, there is a relatively low probability that the traction battery has a safety risk. Similarly, when the current and voltage of the traction battery are anomalous, the insulation resistance thereof is reduced, or the sensor or actuator is faulty, there is a relatively high probability of a safety risk. There is a relatively high probability of a safety risk when the environmental temperature and humidity are relatively high. Therefore, the current risk probability of the traction battery may be determined by determining whether actual values of the above parameters are within preset high-risk threshold intervals.

The following describes a possible process of determining the current risk probability.

In a possible embodiment, the current risk probability includes at least a high-risk probability and a low-risk probability. If the current risk probability is a high-risk probability, it is determined that the time interval for the next wake-up is a first preset time interval; or if the current risk probability is a low-risk probability, it is determined that the time interval for the next wake-up is a second preset time interval, where the first preset time interval is less than the second preset time interval.

Taking the state of charge of the traction battery, the cell temperature, and the difference between the temperatures of the cells as an example, when any one of the following conditions is met: the state of charge is greater than 90%, the cell temperature is greater than 40° C., or the difference between the temperatures of the cells is greater than 6° C., a safety risk of the traction battery is relatively high. It is assumed that the state of charge of the traction battery obtained at a time is 95%, the cell temperature obtained at this time is 45° C., and the difference between the temperatures of the cells obtained at this time is 7° C. Then, it is determined that the current risk probability is a high-risk probability, and it is determined, based on the high-risk probability, that the time interval for the next wake-up is 10 min. It is assumed that the state of charge of the traction battery obtained at another time is 80%, the cell temperature obtained at this time is 39° C., and the difference between the temperatures of the cells obtained at this time is 1° C. Then, it is determined that the current risk probability is a low-risk probability, and it is determined, based on the low-risk probability, that the time interval for the next wake-up is 20 min.

Taking the thermal management mode as an example, when a current state of charge is only 35%, a thermal management strategy in an energy saving mode is used to reduce energy consumption. Therefore, a cooling on time of the traction battery may be relatively conservative. If the traction battery starts to be cooled at 40° C. in a standard mode, in the current energy-saving mode, it is very likely that the cooling will be turned on at 44° C. In this case, it may be determined that the current risk probability is a high-risk probability, and a corresponding time interval for the next wake-up needs to be shortened to 10 min.

Certainly, the above specific examples are only used to illustrate the determination process of the current risk probability and the time interval, and are not intended to limit the scope of protection of the present application. Those skilled in the art can select the foregoing one or several parameters to determine the current risk probability and the time interval based on the foregoing principles. For example, those skilled in the art may determine, only based on the foregoing one parameter being within a high-risk threshold interval, that the current risk probability is a high-risk probability, or may determine, based on the foregoing plurality of parameters being within corresponding high-risk threshold intervals at the same time, that the current risk probability is a high-risk probability. When a plurality of parameters are used to determine the current risk probability at the same time, those skilled in the art may either determine the current risk probability by determining the number of parameters within high-risk threshold intervals, or use a weighted calculation method for comparison results of the parameters to calculate a probability score of a current risk and determine the current risk probability based on the probability score. This is not limited in the present application, provided that the current risk probability of the traction battery can be properly determined and the time interval can be determined accordingly.

In addition, although the foregoing embodiments are described in conjunction with the current risk probability including a high-risk probability and a low-risk probability, the present application is not limited thereto. In other possible embodiments, the current risk probability may also be divided into more parts, so that determination of the time interval is more precise. For example, the current risk probability may alternatively include a high-risk probability, a medium-risk probability, and a low-risk probability.

When the battery is not in the anomalous state, the current risk probability of the battery is determined and the time interval for the next wake-up is determined based on the current risk probability, so that in the present application, when safety monitoring is performed on the battery, the time interval can be changed based on the risk probability of the battery. When a safety risk of the battery is relatively low, the battery should be monitored as little as possible, and when the safety risk of the battery is relatively high, the battery should be monitored as much as possible, thereby improving the quality of obtaining data while effectively controlling energy consumption.

S213: Control the battery management system to enter hibernation state again. In this step, when the safety risk of the traction battery is relatively low, there is no need to continuously monitor the traction battery, and therefore, the battery management system can be controlled to enter hibernation state again. Because a time when the battery management system is woken up to obtain status data is very short, and there is no other controllers being woken up in processes other than the data obtaining process, the energy consumption of monitoring can be greatly reduced while the status data can be effectively obtained.

S215: Wake up the wireless communications network, continuously obtain the status data of the traction battery, and upload the obtained status data and/or the alarm signal to the remote monitoring platform by means of the wireless communications network until the anomalous state is removed. In this step, when the safety risk of the traction battery is relatively high, it is required to obtain a sufficient amount of data and upload the data to the remote monitoring platform in order to issue an alarm in time and provide a basis for a failure analysis of the traction battery. In this case, the wireless communications network is immediately woken up, and the status data of the traction battery is continuously obtained, and the continuously obtained status data is uploaded to the remote monitoring platform together with the alarm signal until the anomalous state is removed. Continuously obtaining the status data may be obtaining the data every second or every few seconds in the present application. In short, the time interval is much shorter than the time interval when the traction battery is not in the anomalous state, and therefore, there is a sufficient amount of obtained data.

When the battery is in the anomalous state, the status data is continuously obtained and the data and/or the alarm signal are/is uploaded to the remote monitoring platform. According to the safety monitoring method in the present application, data can be continuously recorded when the battery is anomalous, thereby providing an effective basis for a fault analysis, and maintenance and upgrade of a battery system, etc.

In a possible embodiment, in order to ensure a correspondence between monitored data and a sampling time, timestamp data may be added when the status data is obtained. In this way, the remote monitoring platform can accurately and correspondingly analyze data, so that sending data at a time is not affected by a delay of transmission and reception or network conditions. A method for adding the timestamp data is relatively conventional to those skilled in the art, and details are not described herein.

It should be noted that although the detailed steps of the method of the invention are described in detail above, those skilled in the art can combine, split, and change the order of the above steps without departing from the basic principles of the invention. The technical solution modified in such a way does not change the basic idea of the invention, and therefore also falls within the scope of protection of the invention. For example, those skilled in the art can change at will the order of the above related steps (S205 to S209) of recording the cumulative number of monitoring times, the step (S211) of determining the time interval for the next wake-up based on the current risk probability, and the step (S213) of controlling the battery management controller to enter hibernation state again, and the control method after the order change does not depart from the basic idea of the present application.

Figure 3:
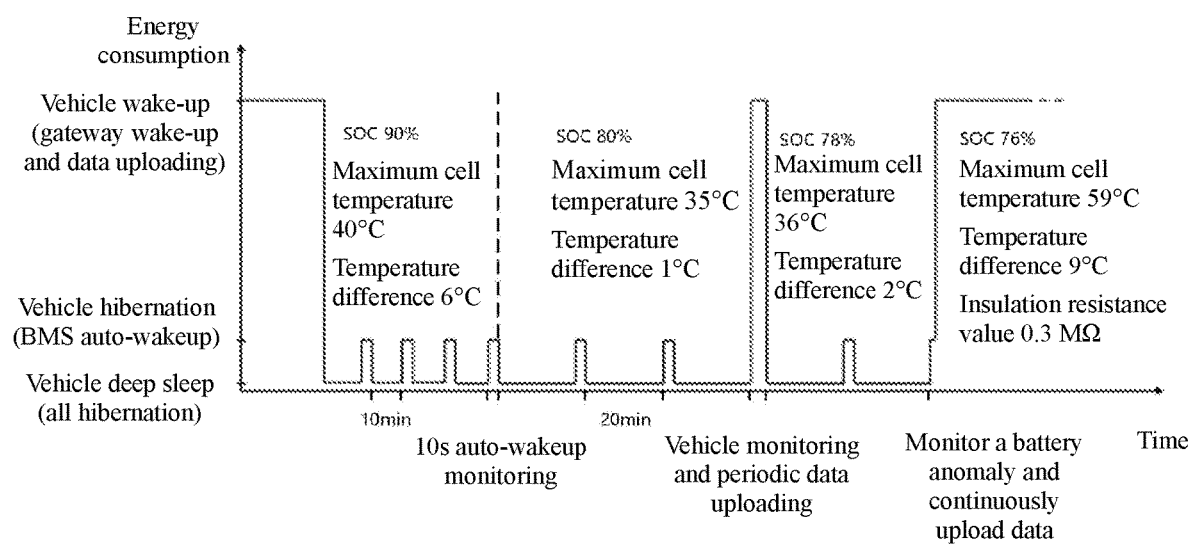
FIG. 3 is a time-energy consumption diagram of a specific embodiment of a safety monitoring method for an electric vehicle according to the invention.
Figure 4:
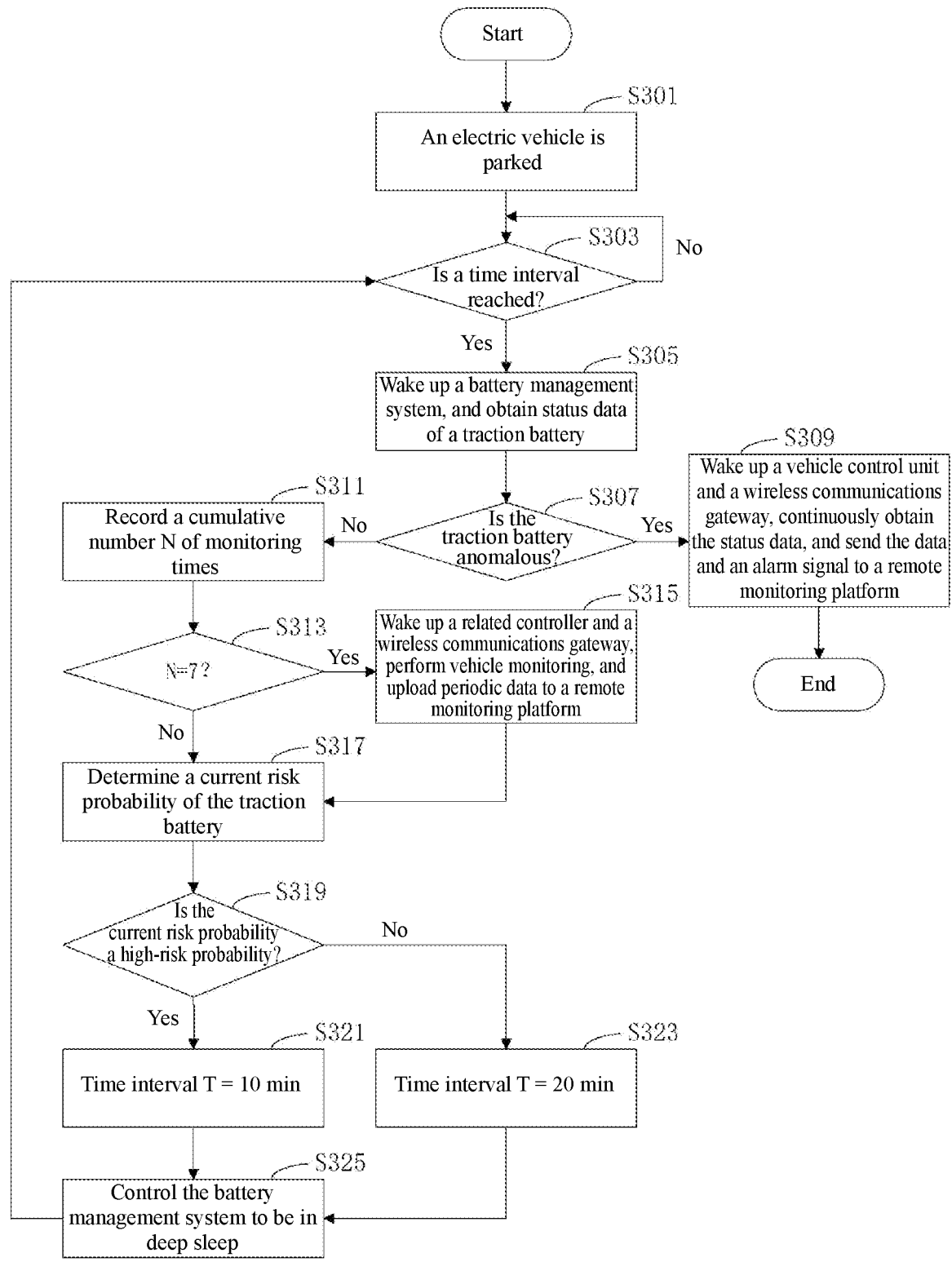
FIG. 4 is a logic diagram of a specific embodiment of a safety monitoring method for an electric vehicle according to the invention.

The following describes a safety monitoring process for an electric vehicle in a possible embodiment in conjunction with FIG. 3 and FIG. 4. FIG. 3 is a time-energy consumption diagram of a specific embodiment of a safety monitoring method for an electric vehicle according to the invention; and FIG. 4 is a logic diagram of a specific embodiment of a safety monitoring method for an electric vehicle according to the invention.

As shown in FIG. 3, according to the order on the coordinate axis of time, when an electric vehicle is in a normal running state, electronic controllers of the vehicle are in a wake-up state, the vehicle is monitored in real time, and data is uploaded by means of a wireless communications network. After driving to a position, a driver parks and locks the vehicle and leaves, and the electronic controllers of the vehicle enter hibernation state from a real-time monitoring state. In the next 100 min, a battery management system has performed 10 s auto-wakeup monitoring through four short intervals (10 min) and three long intervals (20 min), and all monitoring results are that a status of a battery is stable and safe. When the seventh monitoring is performed, the vehicle is woken up. In addition to routine monitoring of the battery, controllers of the vehicle are also monitored, and then accumulated status data and monitored vehicle data are sent by means of the wireless communications network. Then, the vehicle is in hibernation again. After auto-wakeup monitoring is performed through two long intervals (20 min) after the vehicle is in hibernation, during the second auto-wakeup, anomalous events such as a relatively high cell temperature, a relatively large difference between temperatures of cells, and a reduced insulation resistance value occur. In this case, the vehicle is immediately woken up, alarm information is sent by means of the wireless communications network, and real-time status data of the traction battery is continuously uploaded.

Referring to FIG. 4, after an electric vehicle is parked (S301), a traction battery is disconnected, and electronic controllers of the vehicle are in hibernation.

(1) Step S303 is performed first to determine whether a hibernation time reaches a time interval; and if hibernation time reaches the time interval, step S305 is performed to wake up a battery management system, and obtain status data of the traction battery; or if hibernation time does not reach the time interval, the process returns to step S301.

(2) After the status data of the traction battery is obtained, step S307 is performed to determine, based on the status data, whether the traction battery is in an anomalous state; and if the traction battery is in the anomalous state, step S309 is performed to wake up a vehicle control unit and an onboard gateway, continuously obtain the status data of the traction battery, and upload the status data and an alarm signal to a remote monitoring platform by means of the vehicle control unit and the onboard gateway; or if the traction battery is not in the anomalous state, step S311 is performed to record a cumulative number N of monitoring times.

(3) After the cumulative number N of monitoring times is recorded, then step S313 is performed to determine whether the cumulative number of monitoring times N=7 is satisfied; and if N=7 is satisfied, step S315 is performed to wake up related controllers of the vehicle and the onboard gateway, monitor the vehicle to obtain monitored vehicle data, and then upload the monitored vehicle data and accumulated status data to the remote monitoring platform by means of the vehicle control unit and the onboard gateway, and then step S317 is performed to determine a current risk probability of the traction battery; or if N=7 is not satisfied, step S317 is directly performed to determine the current risk probability of the traction battery.

(4) After the current risk probability is determined, step S319 is performed to determine whether the current risk probability is a high-risk probability; and if the current risk probability is a high-risk probability, step S321 is performed to determine a time interval T=10 min; or if the current risk probability is not a high-risk probability, step S323 is performed to determine a time interval T=20 min.

(5) After step S321 or S323 is performed, step S325 is performed to control the battery management system to be in hibernation again.

(6) After step S325 is performed, the process returns to step S303 to redetermine whether hibernation time reaches the time interval. So far, a monitoring cycle of the traction battery is completed.

Corresponding to the foregoing safety monitoring method, the present application further provides a safety monitoring system for an electric vehicle, the safety monitoring system including: a wake-up control module configured to: when a vehicle is in a parked state, wake up a battery management controller from hibernation state at specific time intervals; when the battery is not in the anomalous state, control the battery management controller to enter hibernation state again; and when the battery is in the anomalous state, further wake up a wireless communications network in hibernation state; a data obtaining module configured to obtain status data of the battery by means of the battery management controller; a battery status determination module configured to determine, based on the status data, whether the battery is in the anomalous state; and a sending control module configured to upload the status data and/or an alarm signal to a remote monitoring platform by means of the wireless communications network.

In a possible embodiment, the safety monitoring system further includes: a number-of-times recording module configured to: when the battery is not in the anomalous state, record a cumulative number of monitoring times; and a number-of-times determination module configured to determine whether the cumulative number of monitoring times reaches a preset number of times, where the wake-up control module is further configured to: when the cumulative number of monitoring times reaches the preset number of times, wake up the wireless communications network in hibernation state; the sending control module is further configured to upload the previously accumulated status data to the remote monitoring platform by means of the wireless communications network; and the wake-up control module is further configured to: after the uploading ends, control the wireless communications module to enter hibernation state again.

In a possible embodiment, the data obtaining module is further configured to: when the cumulative number of monitoring times reaches the preset number of times, obtain monitored vehicle data after vehicle monitoring is performed on the vehicle; and the sending control module is further configured to upload the monitored vehicle data and the accumulated status data to the remote monitoring platform by means of the wireless communications network.

In a possible embodiment, the safety monitoring system further includes: a number-of-times clearing module configured to: after the uploading ends, clear the cumulative number of monitoring times.

In a possible embodiment, the data obtaining module is further configured to: when the battery is in the anomalous state, continuously obtain the status data of the battery; and the sending control module is further configured to upload the continuously obtained status data and/or the alarm signal to the remote monitoring platform by means of the wireless communications network until the anomalous state is removed.

In a possible embodiment, the wake-up control module wakes up the wireless communications network in hibernation state in the following manner: waking up a wireless communications module directly or indirectly connected to the battery management controller; and/or waking up a vehicle control unit and an onboard gateway connected to the vehicle control unit; and/or waking up the vehicle control unit, the onboard gateway connected to the vehicle control unit, and a telematics box connected to the onboard gateway.

In a possible embodiment, the safety monitoring system further includes: a risk determination module configured to: when the battery is not in the anomalous state, determine a current risk probability of the battery; and a time interval determination module configured to determine, based on the current risk probability, a time interval for the next wake-up.

In a possible embodiment, the risk determination module determines the current risk probability of the battery based on one or more of the status data of the battery, diagnostic data of the battery, thermal management mode of the battery, and environmental data.

In a possible embodiment, the current risk probability includes a high-risk probability and a low-risk probability, and the time interval determination module determines, based on the current risk probability in the following manner, the time interval for the next wake-up: if the current risk probability is a high-risk probability, determining the time interval for the next wake-up as a first preset time interval; or if the current risk probability is a low-risk probability, determining the time interval for the next wake-up as a second preset time interval, where the first preset time interval is less than the second preset time interval.

In a possible embodiment, the status data includes at least one of a state of charge, a cell temperature, a cell voltage, a difference between temperatures of cells, and an insulation resistance value.

In a possible embodiment, the battery status determination module determines, based on the status data in the following manner, whether the battery is in the anomalous state: when at least one of the following determination conditions is satisfied, determining that the battery is in the anomalous state, where the determination conditions include: the cell temperature is greater than or equal to a maximum temperature threshold; the difference between the temperatures of the cells is greater than or equal to a maximum temperature difference threshold; and the insulation resistance value is less than or equal to a minimum resistance threshold; and when none of the above determination conditions are satisfied, determining that the battery is not in the anomalous state.

The foregoing safety monitoring system for an electric vehicle is used to implement any of the foregoing embodiments of the safety monitoring method for an electric vehicle. The technical principles, technical problems solved, and technical effects produced by the system and the method are similar, and those skilled in the art can clearly understand, for convenience and brevity of the description, for a specific working process and a related description of the safety monitoring system for an electric vehicle, refer to the content described in the embodiments of the safety monitoring method for an electric vehicle, and details are not described herein again.

The present application further provides a storage device. The storage device may be configured to store a program that performs the safety monitoring method for an electric vehicle in any of the foregoing method embodiments, and the program may be loaded and run by a processor to implement the safety monitoring method for an electric vehicle. For ease of description, only parts related to the embodiment of the invention are shown. For specific technical details that are not disclosed, refer to the method part of the embodiments of the invention. The storage device may be a storage device formed by various electronic devices. Optionally, the storage in this embodiment of the present invention is a non-transitory computer-readable storage medium.

The present application further provides a control device. The control device includes a processor and a storage device. The storage device may be configured to store a program that performs the safety monitoring method for an electric vehicle in any of the foregoing method embodiments, the processor may be configured to execute the program in the storage device, and the program includes, but is not limited to, a program that performs the safety monitoring method for an electric vehicle in the foregoing method embodiment. For ease of description, only parts related to the embodiment of the invention are shown. For specific technical details that are not disclosed, refer to the method part of the embodiments of the invention. The control device may be a control device formed by various electronic devices. Optionally, the control device in the embodiments of the invention is a microprocessor such as a single-chip microcomputer.

Those skilled in the art can understand that some or all of the procedures of the invention in the method of the foregoing embodiment may also be implemented by a computer program instructing relevant hardware. The computer program may be stored in a computer-readable storage medium. The computer program, when executed by a processor, may implement the steps of the foregoing method embodiments. The computer program includes computer program code, and the computer program code may be in the form of source code, object code, executable file, or some intermediate forms. The computer-readable medium may include: any entity or device, medium, USB flash disk, removable hard disk, magnetic disk, optical disc, computer memory, read-only memory, random access memory, electrical carrier signal, telecommunications signal, software distribution medium, etc. that can carry the computer program code. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

It should be further noted that the safety monitoring system for an electric vehicle provided in the foregoing embodiments is only illustrated by the division of the above functional units (such as the wake-up control module, the data obtaining module, the battery status determination module, and the sending control module). In practical applications, the above functional units are allocated to different functional units according to requirements, that is, the functional units in the embodiments of the invention are further split or combined, for example, the functional units in the above embodiments may be combined into one functional unit, or further split into a plurality of sub-units to complete all or some of the functions described above. The names of the functional units involved in the embodiments of the invention are merely for distinguishing purpose and are not to be construed as limiting the invention.

Heretofore, the technical solutions of the invention have been described in conjunction with the preferred embodiments shown in the drawings, however, those skilled in the art can readily understand that the scope of protection of the invention is obviously not limited to these specific embodiments. Those skilled in the art could make equivalent changes or substitutions to the related technical features without departing from the principles of the invention, and all the technical solutions after the changes or the substitutions fall within the scope of protection of the invention.

The invention claimed is:

1. A safety monitoring method for a vehicle, wherein the safety monitoring method comprises:
when a vehicle is in a parked state, a battery management controller waking up itself from a hibernation state to a non-hibernation state at specific time intervals, and obtaining status data of a battery by means of the battery management controller;
determining, based on the status data, whether the battery is in an anomalous state; and
when the battery is not in the anomalous state, controlling the battery management controller to enter the hibernation state again; or
when the battery is in the anomalous state, further waking up a wireless communications network from the hibernation state, and uploading the status data and/or an alarm signal to a remote monitoring platform by means of the wireless communications network;
wherein the battery management controller is always in a power-supplied state, and controls itself to switch from the hibernation state to the non-hibernation state, the battery management controller is a controller running a battery management system.

2. The safety monitoring method for a vehicle according to claim 1, wherein the safety monitoring method further comprises:
when the battery is not in the anomalous state, recording a cumulative number of monitoring times;
determining whether the cumulative number of monitoring times reaches a preset number of times; and
when the cumulative number of monitoring times reaches the preset number of times, waking up the wireless communications network from the hibernation state, and uploading the previously accumulated status data to the remote monitoring platform by means of the wireless communications network; and
after the uploading ends, controlling the wireless communications network to enter hibernation state again.

3. The safety monitoring method for a vehicle according to claim 2, wherein the safety monitoring method further comprises:
when the cumulative number of monitoring times reaches the preset number of times, performing vehicle monitoring on the vehicle, and obtaining monitored vehicle data; and
uploading the monitored vehicle data and the accumulated status data to the remote monitoring platform by means of the wireless communications network.

4. The safety monitoring method for a vehicle according to claim 2, wherein the safety monitoring method further comprises:
after the uploading ends, clearing the cumulative number of monitoring times.

5. The safety monitoring method for a vehicle according to claim 1, wherein the safety monitoring method further comprises:
when the battery is in the anomalous state, continuously obtaining the status data of the battery, and uploading the obtained status data and/or an alarm signal to the remote monitoring platform by means of the wireless communications network until the anomalous state is removed.

6. The safety monitoring method for a vehicle according to claim 1, wherein the safety monitoring method further comprises at least one of:
waking up a wireless communications module directly or indirectly connected to the battery management controller;
waking up a vehicle control unit and an onboard gateway connected to the vehicle control unit; and waking up the vehicle control unit, the onboard gateway connected to the vehicle control unit, and a telematics box connected to the onboard gateway.

7. The safety monitoring method for a vehicle according to claim 1, wherein the safety monitoring method further comprises:
when the battery is not in the anomalous state, determining a present risk probability of the battery; and
determining, based on the present risk probability, a time interval for the next wake-up.

8. The safety monitoring method for a vehicle according to claim 7, wherein the present risk probability is determined based on one or more of the status data of the battery, diagnostic data of the battery, thermal management mode of the battery, and environmental data.

9. The safety monitoring method for a vehicle according to claim 7, wherein the present risk probability comprises a high-risk probability and a low-risk probability, wherein the high-risk probability is risk probability above a threshold and low-risk probability is risk probability below the threshold, and the step of determining, based on the present risk probability, a time interval for the next wake-up further comprises:
if the present risk probability is the high-risk probability, determining the time interval for the next wake-up as a first preset time interval; or
if the present risk probability is the low-risk probability, determining the time interval for the next wake-up as a second preset time interval,
wherein the first preset time interval is less than the second preset time interval.

10. The safety monitoring method for a vehicle according to claim 1, wherein the status data comprises at least one of a state of charge, a cell temperature, a cell voltage, a difference between temperatures of cells, and an insulation resistance value.

* * * * *